United States Patent
Wongso et al.

(10) Patent No.: US 10,956,083 B2
(45) Date of Patent: Mar. 23, 2021

(54) METHOD AND SYSTEM FOR INPUT-OUTPUT THROTTLING TO IMPROVE QUALITY OF SERVICE IN A SOLID STATE DRIVE

(71) Applicant: Western Digital Technologies, Inc., San Jose, CA (US)

(72) Inventors: Mervyn Wongso, Gilbert, AZ (US); Rushang Karia, Tempe, AZ (US); Edoardo Daelli, Longmont, CO (US); Jacob Schmier, Gilbert, AZ (US); Kevin Corbin, Chandler, AZ (US); Lakshmana Rao Chintada, Gilbert, AZ (US)

(73) Assignee: Western Digital Technologies, Inc., San Jose, CA (US)

( * ) Notice: Subject to any disclaimer, the term of this patent is extended or adjusted under 35 U.S.C. 154(b) by 122 days.

(21) Appl. No.: 15/693,021

(22) Filed: Aug. 31, 2017

(65) Prior Publication Data
US 2018/0173464 A1  Jun. 21, 2018

Related U.S. Application Data

(60) Provisional application No. 62/435,690, filed on Dec. 16, 2016.

(51) Int. Cl.
*G06F 3/06* (2006.01)
*G06F 11/30* (2006.01)
(Continued)

(52) U.S. Cl.
CPC ............ *G06F 3/0659* (2013.01); *G06F 3/061* (2013.01); *G06F 3/0614* (2013.01);
(Continued)

(58) Field of Classification Search
CPC .... G06F 3/0659; G06F 3/0614; G06F 3/0679; G06F 9/5016; G06F 11/34
See application file for complete search history.

(56) References Cited

U.S. PATENT DOCUMENTS 7,849,257 B1 * 12/2010 Kim ...................... G06F 3/0604
707/689
8,473,566 B1 * 6/2013 Cardente ................. G06F 3/061
370/252

(Continued)

*Primary Examiner* — Andrew J Cheong
(74) *Attorney, Agent, or Firm* — Brinks Gilson & Lione

(57) ABSTRACT

A non-volatile memory (NVM) system receives host requests that each specify a memory operation to be performed by the NVM system, the specified memory operations including read operations and write operations, and performs a set of operations for each memory operation specified by a received host request. The set of operations performed for each such memory operation include: initiating performance the memory operation; determining a throttle interval for the memory operation in accordance with at least a first factor, corresponding to available space in a write cache of the non-volatile memory system, and a second factor, corresponding to a metric corresponding to prevalence of write operations in the memory operations specified by the received host requests; and returning to the host system a response associated with the memory operation at a time no earlier than a start time associated with the memory operation plus the determined throttle interval.

22 Claims, 3 Drawing Sheets

(51) Int. Cl.
*G06F 11/34* (2006.01)
*G06F 9/50* (2006.01)
*G06F 1/32* (2019.01)
*G06F 1/3234* (2019.01)

(52) U.S. Cl.
CPC ........ *G06F 3/0679* (2013.01); *G06F 11/3034* (2013.01); *G06F 1/32* (2013.01); *G06F 1/3275* (2013.01); *G06F 9/5016* (2013.01); *G06F 11/34* (2013.01); *G06F 11/3409* (2013.01)

(56) References Cited

U.S. PATENT DOCUMENTS

| | | | | |
|---|---|---|---|---|
| 8,531,791 | B1* | 9/2013 | Reid | G11B 20/10009 360/31 |
| 2011/0185117 | A1* | 7/2011 | Beeston | G06F 12/084 711/111 |
| 2015/0236926 | A1* | 8/2015 | Wright | H04L 41/5022 709/224 |
| 2015/0261473 | A1* | 9/2015 | Matsuyama | G06F 3/0625 711/103 |
| 2015/0347040 | A1* | 12/2015 | Mathur | G06F 3/0616 711/103 |
| 2017/0060763 | A1* | 3/2017 | Maheshwari | G06F 12/0866 |
| 2017/0160953 | A1* | 6/2017 | Hirata | G06F 3/0611 |
| 2017/0285945 | A1* | 10/2017 | Kryvaltsevich | G06F 3/061 |

* cited by examiner

METHOD AND SYSTEM FOR INPUT-OUTPUT THROTTLING TO IMPROVE QUALITY OF SERVICE IN A SOLID STATE DRIVE

CROSS-REFERENCE TO RELATED APPLICATIONS

This application claims the benefit of U.S. Provisional App. Ser. No. 62/435,690, filed Dec. 16, 2016, the entirety of which is hereby incorporated herein by reference.

TECHNICAL FIELD

The disclosed embodiments relate generally to memory systems, and in particular, to solid state drives or solid state storage systems having non-volatile memory (e.g., one or more flash memory devices) and mechanisms for providing storage services that meet predefined quality of service standards.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Garbage collection operations are performed for reclaiming space for host writes and for ensuring data read reliability. As non-volatile memory size in enterprise systems continues to grow, and such system are used by an increasing number and variety of hosts having different memory usage patterns, garbage collection to ensure data integrity, as well as for data reclamation, consumes more resources of the memory devices and potentially has a greater impact on the availability of non-volatile memory to the hosts and the quality of service provided to the hosts. Furthermore, as host workloads vary, the resulting storage operations in a solid state drive used by the host will vary, causing the host to observe varying, bursty throughput and inconsistent quality of service (QoS) from the solid state drive. Therefore, it would be desirable for a solid state drive or non-volatile memory system to provide a host system with consistent quality of service, despite varying workloads on the host system.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable adaptive verify voltage adjustment in memory devices.

The disclosed device and method improve the performance and reliability of a non-volatile memory (NVM) system by throttling responses to host requests returned by the NVM system to a host system. By delaying at least some responses to host requests returned by the NVM system, response times to host requests are made more consistent, while still satisfying predefined quality of service standards. In addition, the delayed responses provide the NVM system with pauses during which it can reduce the backlog of memory operations whose processing has not yet been completed.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

Figure 1:
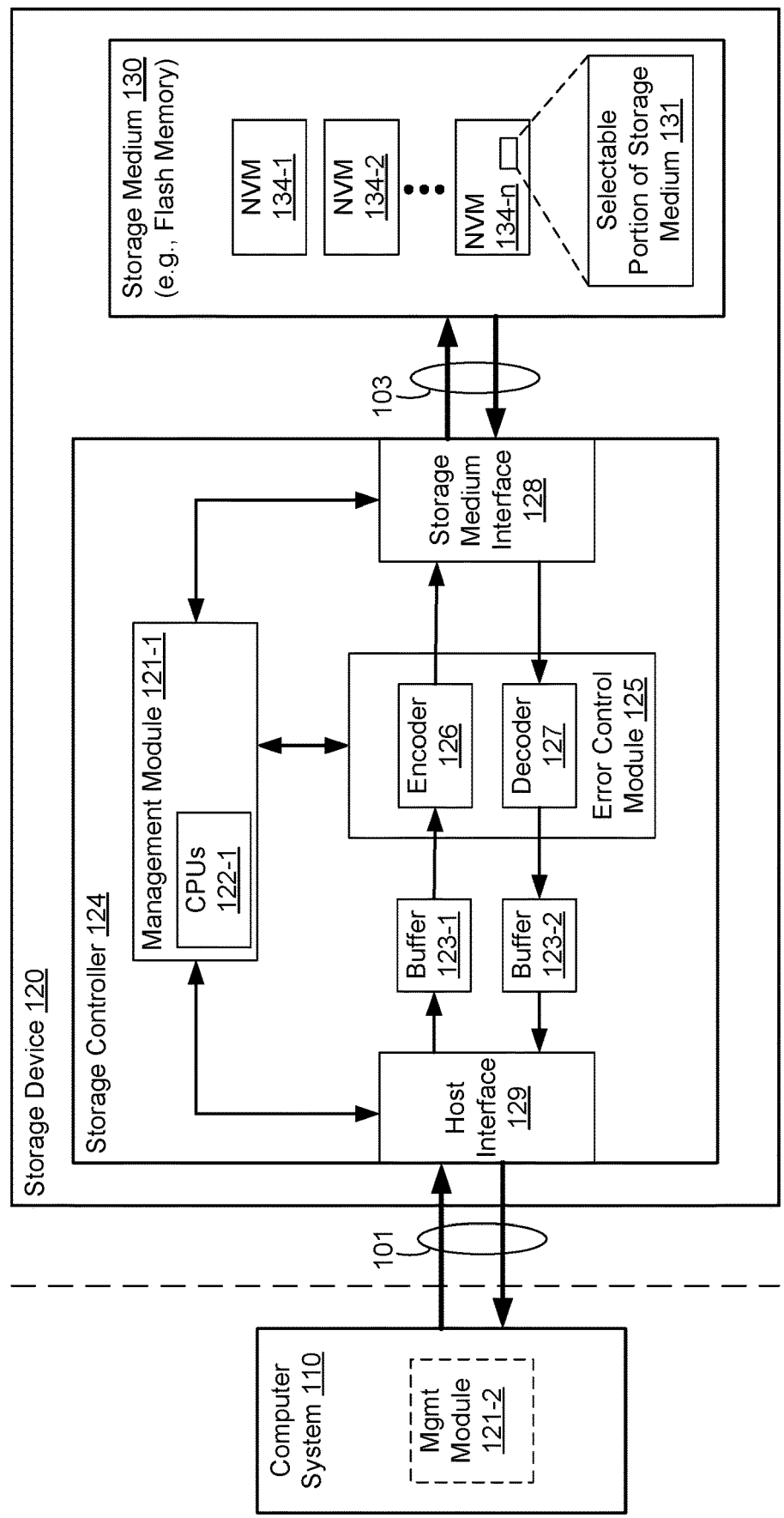
FIG. 1 is a block diagram illustrating an implementation of a non-volatile memory system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable adaptive verify voltage adjustment in memory devices. Some implementations include systems, methods and/or devices to adaptively adjust a verify voltage to reduce storage raw bit error rate.

Implementation of an adaptive throttling mechanism enables a nonvolatile memory (NVM) system, for example a solid state drive, to maintain consistent performance as observed by a host system and to achieve consistent quality of service across varying workloads. Consistent performance is provided through a controlled rate of sending host commands. To provide such consistent performance, a controller of the NVM system, e.g., a front-end module of the controller, adds a delay to time of response for at least some of the read and write commands processed by the NVM system. When each read or write command is received from the host, a timestamp corresponding to the time of receipt is stored by the controller (e.g., by the front-end module) using a high-resolution timer, and the command is passed to a back-end module, sometimes called the flash translation layer (FTL) for processing the command. When the back-end module initiates command processing in the case of write commands or completes command processing in the case of read commands, it informs the front-end module that the back-end module has completed its processing of the command and a targeted command response time. The front-end module compares the current time with the targeted command response time, and if the current time is earlier than the targeted command response time, the front-end module defers sending a response to the host for the memory operation specified by the command until the targeted command response time is reached.

Command processing time by the NVM system can vary due to a variety of factors, including one or more of: the ratio of non-host write commands to host write commands (e.g., a current ratio, or an average ratio over a predefined period of time), the portion of host commands that request write operations, the backlog of queued write commands (sometimes called host command queue depth), the amount of free space in a write cache of the NVM system, and potentially other factors as well. These factors or metrics serve as inputs that the controller uses to determine the delay, if any, to be added before providing a response to each host command. The delay added by the controller (e.g., the front-end module) masks the variance in command processing time from the host system, and also forces the host system to moderate the pace or rate at which it sends new requests to the NVM system, which improves consistency in observed throughput and quality of service.

(A1) More specifically, some embodiments include a method of processing, in a non-volatile memory system, memory operations requested by a host system. The method includes receiving host requests that each specify a memory operation to be performed by the non-volatile memory system, the specified memory operations including read operations and write operations. The method further includes performing a set of operations for each memory operation specified by a received host request, including: initiating performance of the memory operation; determining a throttle interval for the memory operation in accordance with at least a first factor, corresponding to available space in a write cache of the non-volatile memory system, and a second factor, corresponding to a metric corresponding to prevalence of write operations in the memory operations specified by the received host requests; and returning to the host system a response associated with the memory operation at a time no earlier than a start time associated with the memory operation plus the determined throttle interval.

(A2) In some embodiments of the method of A1, the throttle interval is determined in accordance with a weighted sum of two or more factors, the two or more factors including the second factor and a third factor, the third factor corresponding to a ratio of non-host write operations to host write operations in the non-volatile memory system.

(A3) In some embodiments, the method of A2 further includes obtaining a value specifying or corresponding to the throttle interval from a lookup table, using an index to identify a record in the lookup table, wherein the index is equal to or is based on said weighted sum of two or more factors.

(A4) In some embodiments of the method of A3, the lookup table includes three of more records, each record corresponding to a different value of the index, and each record including a plurality of throttle interval values, and determining the throttle interval includes selecting, in accordance with the first factor, a throttle interval value from among the plurality of throttle interval values in a record of the lookup table identified by the index.

(A5) In some embodiments of the method of A4 the throttle interval values included in the three or more records of the lookup table include at least one value corresponding to a throttle interval of zero duration, and a maximum value corresponding to a throttle interval of at least one millisecond.

(A6) In some embodiments, the method of any of A1-A6 includes storing, for each memory operation specified by a received host request, a timestamp representing the start time associated with the memory operation.

(A7) In some embodiments, the method of any of A1-A7 includes providing responses to requests specifying read operations that satisfy a predefined quality of service standard for read operations, and providing responses to requests specifying write operations that satisfy a predefined quality of service standard for write operations.

(A8) In another aspect, a non-volatile memory system includes non-volatile memory, one or more processors, and memory storing one or more programs, which when executed by the one or more processors cause the non-volatile memory system to perform the method of any of A1-A7.

(A9) In yet another aspect, a non-transitory computer readable storage medium stores one or more programs configured for execution by one or more processors of a non-volatile memory system, the one or more programs including instructions that when executed by the one or more processors cause the non-volatile memory system to perform the method of any of A1-A7.

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a non-volatile memory system 100, in accordance with some embodiments. While some example features are illustrated, various other features have not been illustrated for the sake of brevity and so as not to obscure pertinent aspects of the example embodiments disclosed herein. To that end, as a non-limiting example, non-volatile memory system 100 includes a storage device 120 (also sometimes called an information storage device, or a data storage device, or a memory device), which includes a storage controller 124 and a storage medium 130 (sometimes herein called non-volatile memory 130), and is used in conjunction with or includes a computer system 110 (e.g., a host system or a host computer).

In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices. Further, in some embodiments, storage controller 110 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 includes one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130.

In some embodiments, however, storage controller 124 and storage medium 130 are included in the same device (i.e., an integrated device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded storage controller.

Storage medium 130 may include any number (i.e., one or more) of memory devices (e.g., NVM 134-1, NVM 134-2 through NVM 134-n) including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) can also be configured for relatively smaller-scale applications such as personal flash drives or hard-disk replacements for personal, laptop, and tablet computers.

Memory devices (e.g., NVM 134-1, NVM 134-2, etc.) of storage medium 130 include addressable and individually selectable blocks, such as selectable portion of storage medium 131 (also referred to herein as selected portion 131). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, storage controller 124 includes a management module 121-1, a host interface 129, an input buffer 123-1, an output buffer 123-2, an error control module 125 and a storage medium I/O interface 128. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121-1 includes one or more processing units 122-1 (sometimes herein called CPUs, processors, or hardware processors, and sometimes implemented using microprocessors, microcontrollers, or the like) configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, error control module 125, and storage medium I/O 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Error control module 125 is coupled to storage medium I/O 128, input buffer 123-1, output buffer 123-2, and management module 121-1. Error control module 125 is provided to limit the number of uncorrectable errors inadvertently introduced into data during writes to memory or reads from memory. In some embodiments, error control module 125 is executed in software by the one or more CPUs 122-1 of management module 121-1, and, in other embodiments, error control module 125 is implemented in whole or in part using special purpose circuitry to perform data encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123-1 receives data to be stored in storage medium 130 from computer system. The data held in input buffer 123-1 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands (e.g., via data connections 101) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 123-2, where the decoded data is made available to computer system 110. In some embodiments, if the decoding is not successful, storage controller 124 may resort to a number of remedial actions or provide an indication of an irresolvable error condition.

While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection (also sometimes called data recycling). After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
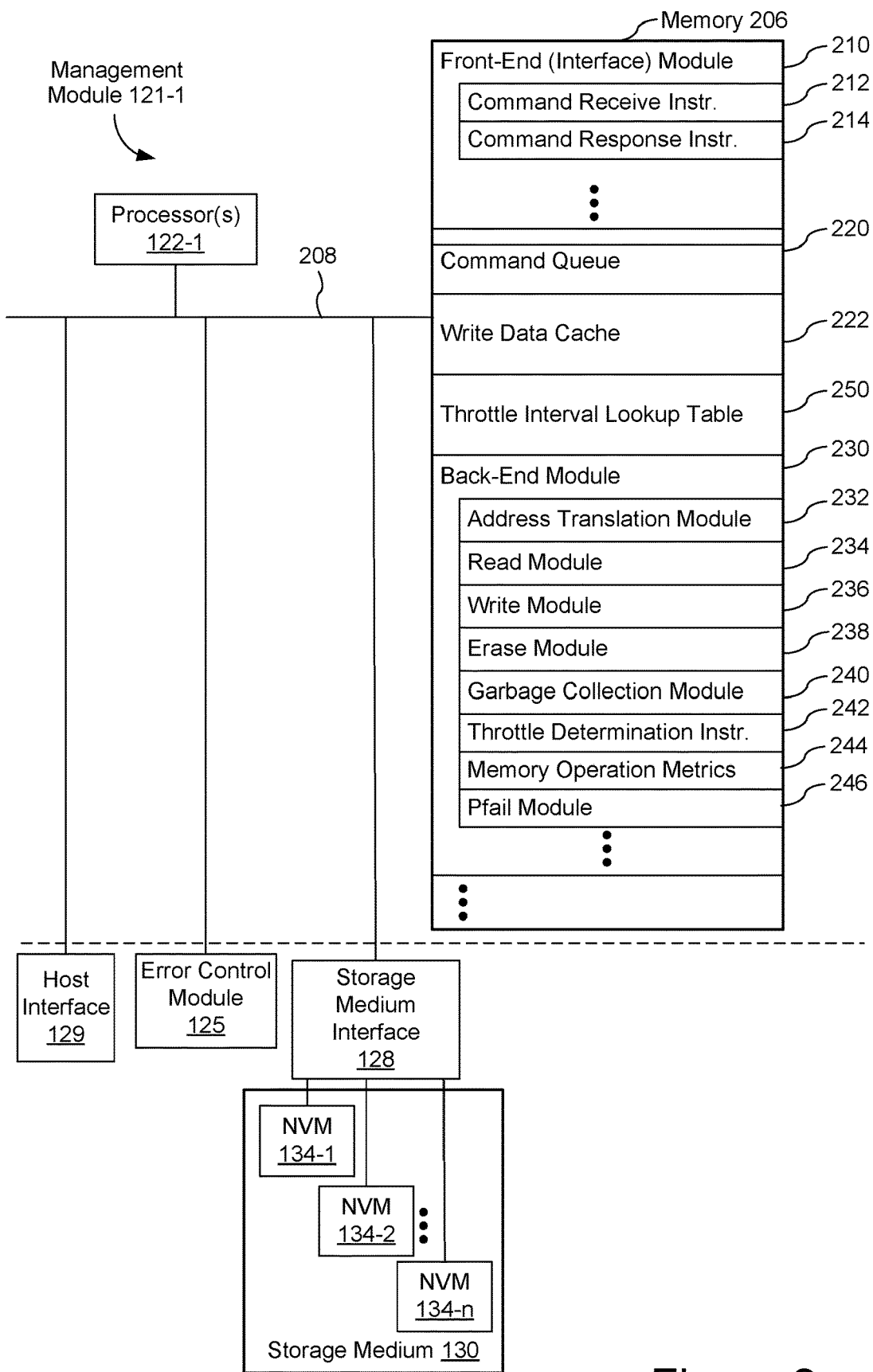
FIG. 2 is a block diagram illustrating a memory management module of a non-volatile memory controller, in accordance with some embodiments.

FIG. 2 is a block diagram illustrating an implementation of a management module 121-1 (hereinafter management module 121 unless specifically designated otherwise), in accordance with some embodiments. Management module 121 typically includes one or more processing units 122-1 (sometimes herein called CPUs, processors, or hardware processors, and sometimes implemented using microprocessors, microcontrollers, or the like) for executing modules, programs and/or instructions stored in memory 206 and thereby performing processing operations; memory 206 (sometimes herein called controller memory); and one or more communication buses 208 for interconnecting these components. Communication buses 208 optionally include circuitry (sometimes called a chipset) that interconnects and controls communications between system components. In some embodiments, management module 121 is coupled to buffers 123-1 and 123-2, error control module 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 122-1. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset or superset thereof:
- front end module 210, sometimes called an interface module used for communicating with a host system via host interface 129, and other components, such as non-volatile memory devices 134 and error control module 125;
- back-end module 230, sometimes called the flash translation layer (FTL) or FTL module;
- one or more a command queues 220, for storing information concerning requests received from a host system;
- write data cache 222 for storing write data to be written to non-volatile memory in accordance with write commands received from the host system; and
- throttle interval lookup table 250, which stores throttle interval values, as described in more detail below with reference to FIG. 3.

In some embodiments, front-end module 210 includes:
- command receiving instructions 212, for receiving requests sent by a host system; and
- command response instructions 214, for responding to the host in conjunction with completion of each memory operation requested by the host.

In some embodiments, back-end module 230 includes:
- an address translation module 232 for mapping logical addresses to physical addresses; address translation module 232 is typically included in embodiments in which the host system sends requests that specify logical addresses, and is typically not included in embodiments in which the host system sends requests that specify physical addresses;
- a read module 234 used for reading data from non-volatile memory devices 134;
- a write module 236 used for writing to non-volatile memory devices 134;
- an erase module 238 used for erasing data from non-volatile memory devices 134;
- a garbage collection module 240 used for controlling a garbage collection process in a storage medium (e.g., storage medium 130, FIG. 1), the garbage collection module 218 reads valid data from blocks that are being garbage collected, and writes that valid data to other blocks in storage medium 130;
- throttle determination instructions 242, for determining a throttle interval to be used when responding to request received from the host system, for example a response that confirms completion of a requested memory operation; and
- power fail (Pfail) module 246, for safely storing in non-volatile memory (e.g., in a region of storage medium 130 reserved for this purpose), upon detection of a power fail condition, data in write data cache 222 that has not yet been stored in storage medium 130, as well as other critical information (e.g., metadata used by management module 121-1 to manage operation of storage device 120) needed for resuming operation of storage device 120 when power is restored.

In some embodiments, power fail module 246, or another module not shown in FIG. 2, automatically, upon restoration of power, restores data saved by power fail module 246 in response to detection of a power fail condition. It is noted that the provision of power fail module 246 allows storage device 120 to respond to host requests for write operations long before the write data for those write operations has been durably stored in storage medium 130, because once the write data has been saved to write data cache 222, the write data is safely stored within the storage device. For example, without limitation, writing a page of write data to storage medium 130 might typically take 1 to 2.5 milliseconds, but responses to each request for write operation are typically returned within 100 to 150 microseconds of receiving each such host request.

In some embodiments, back-end module 230 also includes or stores memory operation metrics 244, including, for example, counts or statistics of the number of host read and host write operations performed during predefined time periods (e.g., during each period of duration D, where D is a value between 0.05 seconds and 2.0 seconds, inclusive, and is typically a value between 0.1 second and 1.0 second, inclusive). In some embodiments, memory operation metrics 244 include a metric indicating the amount of data written to storage medium 130 for recycling, and a metric indicating the amount of data written to storage medium 130 by a host system (i.e., in response to write operations requested by a host system). In some embodiments, memory operation metrics 244 include sufficient information to enable throttle determination instructions 242 to obtain (e.g., generate) a write prevalence metric, corresponding to or indicating the percentage of host memory operations that are write operations. In some embodiments, memory operation metrics 244 include sufficient information to enable throttle determination instructions 242 to obtain (e.g., generate) a recycle ratio, sometimes called a non-host to host write ratio, corresponding to or indicating the ratio of recycling write operations for recycling data to host write operations specified by requests received from a host system. In some embodiments, the recycle ratio is determined in accordance with the following:

$$\text{recycle ratio} = \frac{\text{amount of data written for recycling}}{\text{amount of data written by a host}}$$

$$= \text{write amplification} - 1$$

It is noted that in some embodiments other definitions of the recycle ratio may be used.

In some embodiments, throttle determination instructions 242 are implemented as part of front-end module 210 instead of back-end module 230, and in some other embodiments, portions of throttle determination instructions 242 are implemented in front-end module 210 and other portions are implemented in back-end module 230.

In some embodiments, the one or more command queues 220 and write data cache 222 are used by both front-end module 210 and back-end module 230. For example, front-end module 210 stores memory operation commands in the one or more command queues 220, as requests to perform memory operations are received from a host system, in accordance with some embodiments. In some embodiments, front-end module 210 stores a timestamp for each such memory operation command, indicating the time at which the request to perform the memory operation was received. Similarly, front-end module 210 stores in write data cache 222 the write data received from the host system in conjunction with requests to perform write memory operations received from the host system, in accordance with some embodiments. Further, back-end module 230 reads the memory operation commands in the one or more command queues 220 and executes those commands, and while executing write operations, writes data temporarily stored in write data cache 222 to non-volatile memory 130.

In some embodiments, write data cache 222 has a predefined number of slots or storage locations for storing write data. For example, in some embodiments, write data cache 222 has room for (i.e., has storage capacity for) storing N pages of write data, where each page of write data has M bytes of write data (e.g., 4K bytes, 8K bytes or 16K bytes), where M is an integer that is typically greater than 500, and N is an integer larger than one, and is typically a value in the range of 32 to 256, inclusive, although larger or smaller values might be used in other implementations. In some embodiments, the storage capacity of write data cache 222 is organized as N slots or records, and management module 121-1 keeps track of the number of such slots that are currently unused, where currently unused slots are either erased or contain no valid data that needs to be retained, and thus are available for storage of newly received write data.

Each of the above identified elements may be stored in one or more of the previously mentioned memory devices that together form memory 206, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIG. 3.

Although FIG. 2 shows management module 121-1, FIG. 2 is intended more as a functional description of the various features which may be present in a management module, or non-volatile memory controller, than as a structural schematic of the embodiments described herein. In practice, and as recognized by those of ordinary skill in the art, items shown separately could be combined and some items could be separated. Further, as noted above, in some embodiments, one or more modules of management module 121-1 are implemented in management module 121-2 of computer system 110.

Figure 3:
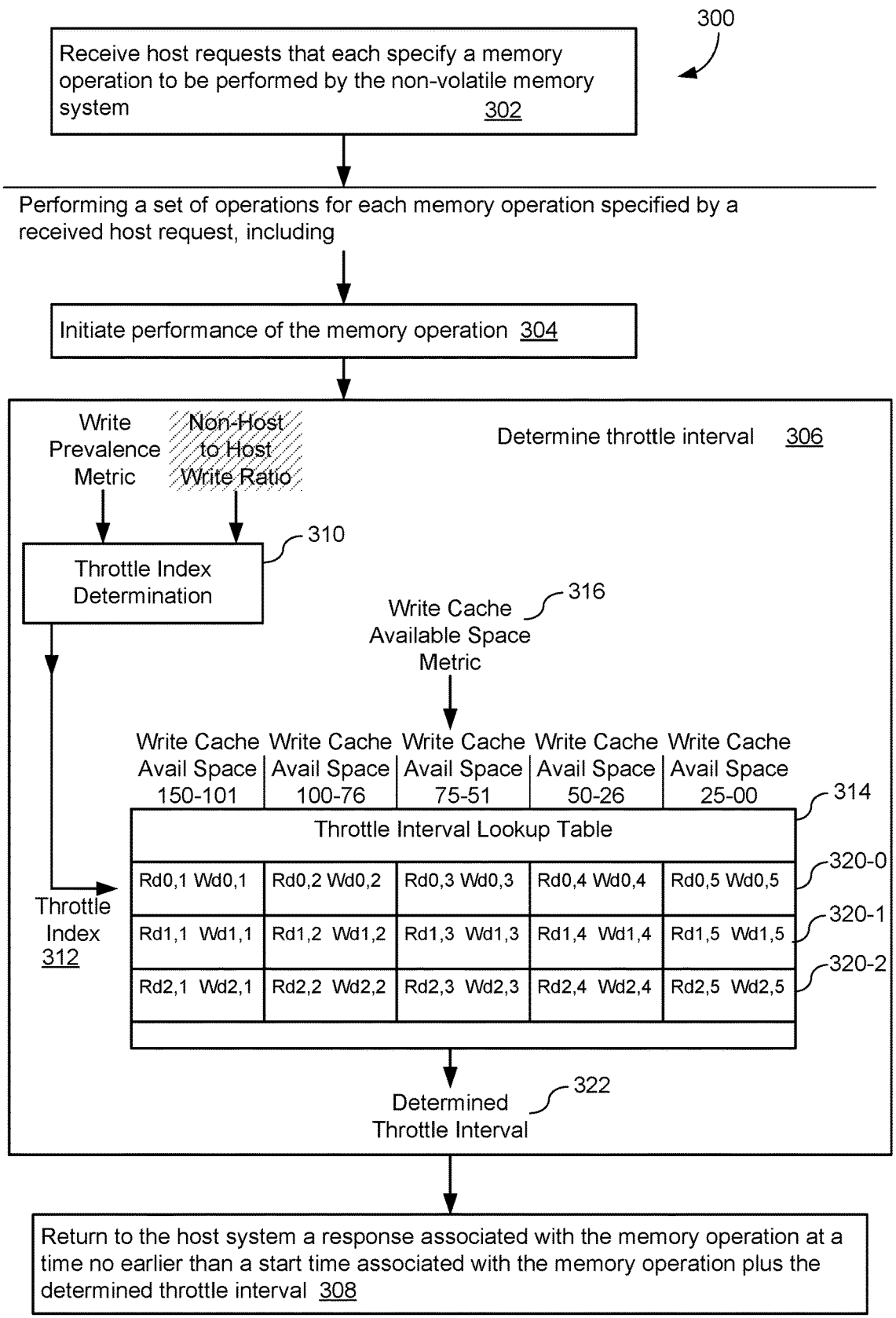
FIG. 3 illustrates a conceptual diagram of a throttle interval lookup table, the determination of a throttle index for identifying a record within the lookup table, and the selection of a throttle interval value in the identified record of the lookup table.

FIG. 3 illustrates a conceptual representation of a method 300 of determining a throttle interval to be used when responding to a request received from a host system, in accordance with some embodiments. With reference to the non-volatile memory system 100 pictured in FIG. 1, in some embodiments, method 300 is performed by a storage device (e.g., storage device 120, FIG. 1) or one or more components of the storage device (e.g., storage controller 124 of storage device 120, FIG. 1, or management module 121-1). In some embodiments, method 300 is governed by instructions that are stored in a non-transitory computer readable storage medium, for example as firmware, and that are executed by one or more processors of a device, such as the one or more processing units (CPUs) 122-1 of management module 121-1 (FIG. 1).

With reference to FIGS. 1 and 2, in some embodiments, the operations of method 300 are performed by a non-volatile memory system, such as storage device 120 (FIG. 1), and are performed or controlled by, front-end module 210 and back-end module 230 in management module 121-1, which in turn are part of the storage device's storage controller 124.

In some embodiments, method 300 uses a throttle interval lookup table 314, corresponding to throttle interval lookup table 314 in FIG. 2, to determine a throttle interval to be used when returning to the host system a response associated with a particular memory operation requested by the host system (e.g., a response that includes information identifying the particular memory operation requested by the host system). In some embodiments, throttle interval lookup table 314 has R rows or records 320, and C columns or pairs of throttle interval values, where R is an integer greater than one and C is an integer greater than one. Each row or record 320 has C columns, sometimes called cells. Each cell, or each column of each row, stores a pair of throttle values: a first throttle interval value (e.g., Rd0,1 in row 0, column 1) for read operations and a second throttle interval value (e.g., Wd0,1 in row 0, column 1) for write operations. The throttle interval used for determining when to respond to each completed memory operation is determined by selecting a row and column of throttle interval lookup table 314, using factors described below, and reading the corresponding throttle interval value from the cell in throttle interval lookup table 314 specified by the selected row and column.

In some embodiments, the throttle interval values in throttle interval lookup table 314 all fall within a predefined range of throttle interval values. For example, the predefined range of throttle interval values may be 0 microseconds to 1000 microseconds for read operations and 0 microseconds to 100 microseconds for write operations. In some embodiments, the low end of the range for read operations is a value between 0 and 250 microseconds, and the high end of the range is a value between 500 and 2000 microseconds. In some embodiments, the low end of the range for write operations is a value between 0 and 25 microseconds, and the high end of the range is a value between 50 and 150 microseconds.

It is noted that a respective throttle interval value in one or more cells of throttle interval lookup table 314 may be zero because those cells correspond to conditions of the storage device that do not require the imposition of a throttle interval. For example, if the backlog of commands, or write commands, in the storage device is low (e.g., the unexecuted commands in command queue 220 have a depth of less than a predefined number), or the amount of space available in write data cache 222 is high (e.g., the number of empty slots is above a predefined threshold), throttling of responses to host requests may not be needed.

In some embodiments, the throttle interval values in throttle interval lookup table 314 for a particular type of operation (e.g., read operation or write operation) generally increase as the write prevalence of host requested memory operations, used to determine throttle index 312, increases, and as write cache available space decreases. Increases in the write prevalence of host requested memory operations correspond to increases in the number of write operations being performed, and thus greater need for throttling responses to host requests for memory operations. Decreases in the write cache available space correspond to increases in the backlog of write operations in the non-volatile memory system, and thus greater need for throttling responses to host requests for memory operations. In embodiments that determine the throttle index in accordance with the recycle ratio (e.g., in accordance with a weighted sum of a second factor (corresponding to write prevalence) and a third factor (corresponding to the recycle ratio), throttle interval values generally increase as the recycle ratio increases, since higher recycle ratios correspond to an increased number of write operations being performed by the non-volatile memory system, and thus greater need for throttling responses to host requests for memory operations.

In the example shown in FIG. 3, in throttle interval lookup table 314, throttle intervals for read operations, represented by Rd0,1-Rd0,5; Rd1,1-Rd1,5; and Rd2,1-Rd2,5, generally increase, within a respective record 320-$i$, from Rdi,1 to Rdi,5, where i represents the throttle index. This is because the columns in the right hand portion of the table correspond to lower amounts of write cache available space than the columns in the left hand portion of the table, and thus a greater need for throttling. Similarly, in throttle interval lookup table 314, throttle intervals for write operations, represented by Wd0,1-Wd0,5; Wd1,1-Wd1,5; and Wd2,1-Wd2,5, generally increase, within a respective record 320-$i$, from Wdi,1 to Wdi,5, where i represents the throttle index. Within a respective column of the throttle interval lookup table 314, throttle intervals for read operations (and write operations) generally increase as the throttle index increases. This is because the records 320 corresponding to higher throttle index values correspond to higher levels of write operations than the records 320 corresponding to lower throttle index values, and thus a greater need for throttling.

Method 300 begins, in some embodiments, when one or more host requests are received (302), where each host request specifies a memory operation to be performed by the non-volatile memory system (e.g., system 100 FIG. 1), the specified memory operations including read operations and write operations. In response to receiving the host requests, the system performs a set of operations for each memory operation specified by a received host request, including initiating (304) performance of the memory operation (e.g., sending the memory operation to a selected flash memory die for execution), and determining (306) a throttle interval for the memory operation, and returning (308) to the host system a response associated with the memory operation, where the response is returned at a time no earlier than a start time associated with the memory operation plus the determined throttle interval.

It is noted that the "meaning" or import of the response to the host system differs for read operations and write operations. For a read operation, the response to the host system indicates that the read operation has been completed and the read data is ready. In some embodiments, the read data is returned to the host with the response, but in many embodiments the response to the read data includes information identifying a buffer in the storage device from which the read data can be obtained and thus in those embodiments the response to the read command does not include the read data. In some embodiments that use buffers in the storage device to temporarily store read data, the host uses a DMA (direct memory access) or RDMA (remote direct memory access) operation to copy the read data from the buffer to a host buffer or other location in the host system.

For a write operation, the response to the host system indicates that the write data for the write operation is safely stored within the storage device, and will eventually be stored in non-volatile memory (e.g., storage medium 130). As explained above, the write data for a write operation is first written to write data cache 222, and is thereafter durably stored in storage medium 130. However, writing the write data to storage medium 130 could take multiple milliseconds to complete, or even begin due to a backlog of write operations, and thus completion of the write operation may occur long after the response to the write command has been sent to the host system.

In some embodiments, the start time associated with a respective memory operation is or corresponds to the time at which the host request specifying the respective memory operation was received by the non-volatile memory system (e.g., storage device 120). In some embodiments, for each memory operation specified by a received host request, a timestamp is recorded by the non-volatile memory system (e.g., by front-end module 210 of management module 121-1) indicating the time at which the host request specifying the memory operation was received, and the time indicated by that timestamp is the start time associated with the memory operation.

In some embodiments, the throttle interval is determined in accordance with at least a first factor, corresponding to available space in a write cache (e.g., write data cache 222) of the non-volatile memory system, and a second factor, corresponding to a metric corresponding to prevalence of write operations in the memory operations specified by the received host requests. For example, as shown in FIG. 3, throttle index determination instructions 310 (corresponding to throttle index determination instructions 242 in FIG. 2) determines a throttle index based on the second factor, and optionally additional factors, in accordance with some embodiments. The throttle index is then used to select a row or record 320 of throttle interval lookup table 314 (which corresponds to throttle interval lookup table 250 in FIG. 2), and the first factor (e.g., represented by write cache available space metric 316 in FIG. 3) is used to identify or select a particular throttle interval value in the selected row or record of throttle interval lookup table 314.

In some embodiments, the second factor is a normalized value, normalized with respect to a predefined range of values, such as 0 to R−1, where R is the number of records 320, sometimes called rows of throttle values, in a throttle interval lookup table 314. For example, a metric corresponding to the percentage of host memory operations that are write operations is mapped to an integer value between 0 and R−1. In some embodiments, that mapping is accomplished using a predefined mathematical formula, while in other implementations predefined ranges of values of the metric are mapped to particular values, between 0 and R−1, of the second factor. In the example shown in FIG. 3, the value of R is 3, because throttle interval lookup table 314 in that example has three rows or records 320 (320-1, 320-2 and 320-3).

In some embodiments, the throttle interval is determined in accordance with a weighted sum of two or more factors, the two or more factors including the second factor and a third factor, the third factor corresponding to a ratio (sometimes herein called the recycle ratio, discussed above) of non-host write operations to host write operations in the non-volatile memory system, as discussed in more detail below. Furthermore, in some such embodiments, as described above, method 300 includes obtaining a value specifying or corresponding to the throttle interval from a lookup table (e.g., throttle interval lookup table 314), using an index (e.g., throttle index 312) to identify a record (e.g., any of records 320) in the lookup table, wherein the index is equal to or is based on the weighted sum or two or more factors. An example of the lookup table is described above.

In some embodiments, throttle index determination instructions 310 (corresponding to throttle index determination instructions 242 in FIG. 2) determine a throttle index based on the second factor. In some embodiments, the throttle index is determined in accordance with a weighted sum of two or more factors, the two or more factors including the second factor and the third factor. For example, the throttle index may be determined in accordance with a sum of (A) the second factor, and (B) the third factor multiplied by 2. As described above, the third factor corresponds to a ratio of non-host write operations to host write operations in the non-volatile memory system, sometimes herein called the recycle ratio. Generation of the recycle ratio is described above.

In some embodiments, the first factor is a normalized value, normalized with respect to a predefined range of values, such as 1 to C, where C is the number of columns in throttle interval lookup table 314, or equivalently, the number of values or pairs of values in each record 320 of throttle interval lookup table 314. For example, the available space in the write cache, which may be represented by the number of slots in the write cache that are empty or contain no valid data, is mapped to an integer value between 1 and C, and that integer is the first factor. In the example shown in FIG. 3, C is equal to 5.

In some embodiments, the throttle index, the first factor, and a value corresponding to the type of memory operation (e.g., read or write) performed in operation 304 are used to look up (e.g., read) a throttle interval value in throttle interval lookup table 314. In this way the throttle interval is determined.

As described above with reference to throttle interval lookup table 314, in some embodiments, the lookup table (e.g., throttle interval lookup table 314) includes three of more records (e.g., records 320)), each record corresponding to a different value of the index (e.g., throttle index 312), and each record includes a plurality of throttle interval values. In such embodiments, determining the throttle interval includes selecting, in accordance with the first factor, a throttle interval value from among the plurality of throttle interval values in a record of the lookup table identified by the index.

Furthermore, as described above with reference to throttle interval lookup table 314, in some such embodiments, the throttle interval values included in the three or more records of the lookup table include at least one value corresponding to a throttle interval of zero duration, and a maximum value corresponding to a throttle interval of at least one millisecond.

In some embodiments, when performing operation 308, the throttle interval is added to the start time of the memory operation whose execution has been completed (in operation 304) to generate an earliest response time. In some embodiments, if the current time, as determined by the non-volatile memory system, is earlier than the earliest response time, the non-volatile memory system defers sending the response associated with the memory operation to the host system until the earliest response time. On the other hand, if the current time, as determined by the non-volatile memory system, is equal to or later than the earliest response time, the non-volatile memory system does not defer sending the response associated with the memory operation to the host system, and thus sends the response to the host system as soon as it is able to do so, without throttling.

In some embodiments, throttle determination instructions 242 determine the earliest response time and pass that to front-end module 210, and command response instructions 214 of front-end module 210 returns to the host system a response associated with the memory operation at a time no earlier than the determined earliest response time. In some other embodiments, throttle determination instructions 242 determine the throttle interval to be used, pass the determined throttle interval to front-end module 210, and command response instructions 214 of front-end module 210 returns to the host system a response associated with the memory operation at a time no earlier than the start time associated with the memory operation plus the determined throttle interval.

In some embodiments, storage device 120 processes read operations requested by a host system so as to satisfy a predefined quality of service standard for read operations, and processes write operations requested by a host system so as to satisfy a predefined quality of service standard for write operations. For example, the predefined quality of service standard for read operations may require that storage device 120 provide responses to no less than 99% of host requests to perform a read operation within 1.5 milliseconds of receiving the request to perform the read operation, or, more generally, provide responses to no less than P1 percentage of host requests to perform a read operation within T1 microseconds of receiving the request to perform the read operation. P1 is typically 98% or higher and T2 is typically 5 milliseconds or less.

In another example, the predefined quality of service standard for write operations may require that storage device 120 provide responses to no less than 99% of host requests to perform a write operation within 125 microseconds of receiving the request to perform the write operation, or, more generally, provide responses to no less than P2 percentage of host requests to perform a write operation within T2 microseconds of receiving the request to perform the write operation. P2 is typically 98% or higher and T2 is typically less than 500 microseconds and more typically is less than 250 microseconds. Storage device 120 processes read operations and write operations so as to satisfy the predefined quality of service standard by, in part, throttling responses to the host requests to perform the read operations and write operations in accordance with the methods and systems described above.

It is noted that throttling of responses to host requests to perform the read operations and write operations causes the host system to moderate the rate at which it sends host requests to perform the read operations and write operations to the storage device. Typically, the host system is configured to stop sending requests to perform read operations and write operations to a storage device when the number of outstanding operations, comprising operations which responses have not yet been received from the storage device, is equal to (i.e., has reached) a predefined maximum queue depth. Once the predefined maximum queue depth has been reached, the host system does not send a new host request (to perform a memory operation) to the storage device until it receives a response to a previously sent host request. By throttling responses to host requests, in accordance with the methods and systems described above, the storage device reduces the rate at which the host system can send host requests to perform memory operations to the storage device, which in turn enables the storage device to consistently respond to requests to perform read operations within the time limit specified by the predefined quality of service standard for read operations, and to consistently respond to requests to perform write operations within the time limit specified by the predefined quality of service standard for write operations.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the "second contact" are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of processing, in a non-volatile memory system, memory operations requested by a host system, comprising:
   receiving host requests that each specify a memory operation to be performed by the non-volatile memory system, the specified memory operations including read operations and write operations; and
   performing a set of operations for each memory operation specified by a received host request, including:
      initiating performance of the memory operation;
      determining a first factor corresponding to available space in a write cache of the non-volatile memory system;
      determining a second factor corresponding to a write prevalence metric indicating a percentage of the memory operations specified by the received host requests that are the write operations;
      determining a throttle interval for the memory operation from a throttle interval lookup table by:
         determining a throttle index based on the second factor;
         selecting a record of the throttle interval lookup table using the throttle index, wherein each record of the throttle interval lookup table comprises a throttle interval value for a read operation and a throttle interval value for a write operation; and
         using the first factor to select a particular throttle interval value from the selected record; and
      returning to the host system a response associated with the memory operation at time no earlier than a start time associated with the memory operation plus the determined throttle interval.

2. The method of claim 1, wherein:
   the first factor is determined in accordance with a weighted sum of two or more factors;
   the two or more factors include the second factor and a third factor; and
   the third factor corresponds to a ratio of non-host write operations to host write operations in the non-volatile memory system.

3. The method of claim 1, wherein:
   the throttle interval lookup table includes three or more records;
   each record corresponds to a different value of the throttle index;
   each record includes a plurality of throttle interval values; and
   determining the throttle interval includes selecting, in accordance with the first factor, a throttle interval value from among the plurality of throttle interval values in a record of the throttle interval lookup table identified by the throttle index.

4. The method of claim 3, wherein the throttle interval values included in the three or more records of the throttle interval lookup table include:
  at least one value corresponding to a throttle interval of zero duration; and
  a maximum value corresponding to a throttle interval of at least one millisecond.

5. The method of claim 1, further comprising storing, for each memory operation specified by a received host request, a timestamp representing the start time associated with the memory operation.

6. The method of claim 1, further comprising:
  providing responses to requests specifying read operations that satisfy a predefined quality of service standard for read operations; and
  providing responses to requests specifying write operations that satisfy a predefined quality of service standard for write operations.

7. The method of claim 1, wherein:
  responsive to the memory operation comprising a read operation, the response indicates that the read operation to non-volatile memory has been completed and that read data is ready to be sent to the host system; and
  responsive to the memory operation comprising a write operation, the response indicates that write data has been stored in the write cache but not in non-volatile memory.

8. The method of claim 7, wherein:
  the read operation is completed before the time no earlier than the start associated with the memory operation plus the determined throttle interval; and
  the write operation is completed after the time no earlier than the start time associated with the memory operation plus the determined throttle interval.

9. A non-volatile memory system, comprising:
  non-volatile memory;
  one or more processors; and
  memory storing one or more programs that, when executed by the one or more processors, cause the non-volatile memory system to:
    receive, from a host system, host requests that each specify a memory operation to be performed by the non-volatile memory system, the specified memory operations including read operations and write operations; and
    perform a set of operations for each memory operation specified by a received host request, including:
      initiating performance of the memory operation;
      determining a first factor corresponding to available space in a write cache of the non-volatile memory system;
      determining a second factor corresponding to a write prevalence metric indicating a percentage of the memory operations specified by the received host requests that are the write operations;
      determining a throttle interval for the memory operation from a data structure by:
        determining a throttle index based on the second factor;
        selecting a record in the data structure using the throttle index, wherein each record of the data structure comprises a throttle interval value for a read operation and a throttle interval value for a write operation; and
        using the first factor to select a particular throttle interval value from the selected record; and
      delaying transmission to the host system of a response associated with the memory operation when a current time is less than a sum of a start time associated with the memory operation and the determined throttle interval.

10. The non-volatile memory system of claim 9, wherein the non-volatile memory comprises a three-dimensional memory array.

11. The non-volatile memory system of claim 9, wherein:
  the first factor is determined in accordance with a weighted sum of two or more factors;
  the two or more factors include the second factor and a third factor; and
  the third factor corresponds to a ratio of non-host write operations to host write operations in the non-volatile memory system.

12. The non-volatile memory system of claim 11, wherein the one or more programs are further configured to cause the non-volatile memory system to select one of a plurality of records based on the weighted sum of the two or more factors.

13. The non-volatile memory system of claim 12, wherein:
  the plurality of records comprise at least three records; and
  the throttle interval values included in the plurality of records of the data structure include:
    at least one value corresponding to a throttle interval of zero duration; and
    a maximum value corresponding to a throttle interval of at least one millisecond.

14. The non-volatile memory system of claim 9, wherein the one or more programs are further configured to cause the non-volatile memory system to store, for each memory operation specified by a received host request, a timestamp representing the start time associated with the memory operation.

15. The non-volatile memory system of claim 9, wherein the one or more programs are further configured to cause the non-volatile memory system to:
  provide responses to requests specifying read operations that satisfy a predefined quality of service standard for read operations; and
  provide responses to requests specifying write operations that satisfy a predefined quality of service standard for write operations.

16. The non-volatile memory system of claim 15, wherein the predefined quality of service standard for read operations comprises a read response time requirement that is less than a write response time requirement for the predefined quality of service standard for write operations.

17. The non-volatile memory system of claim 9, wherein:
  responsive to the memory operation comprising a read operation, the response indicates that the read operation to non-volatile memory has been completed and that read data is ready to be sent to the host system; and
  responsive to the memory operation comprising a write operation, the response indicates that write data has been stored in the write cache but not in non-volatile memory.

18. The non-volatile memory system of claim 17, wherein:
  the read operation is completed before the time no earlier than the start time associated with the memory operation plus the determined throttle interval; and the write operation is completed after the time no earlier than the start time associated with the memory operation plus the determined throttle interval.

19. A non-volatile memory system, comprising:
a non-volatile memory;
means for receiving host requests that each specify a memory operation to be performed by the non-volatile memory system, the specified memory operations including read operations and write operations; and
means for performing a set of operations for each memory specified by a received host request, including:
 means for initiating performance of the memory operation;
 means for determining a first factor corresponding to available space in a write cache of the non-volatile memory system;
 means for determining a second factor corresponding to a write prevalence metric indicating a percentage of the memory operations specified by the received host requests that are the write operations;
 means for determining a throttle interval for the memory operation from a throttle interval lookup table by:
  determining a throttle index based on the second factor;
  selecting a record of the throttle interval lookup table using the throttle index, wherein each record of the throttle interval lookup table comprises a throttle interval value for a read operation and a throttle interval value for a write operation; and
  using the first factor to select a particular throttle interval value from the selected record; and
 means for delaying transmission to a host system a response associated with the memory operation until a time no earlier than a start time associated with the memory operation plus the determined throttle interval.

20. The non-volatile memory system of claim 19, wherein:
the means for determining a throttle interval is further configured to determine the first factor in accordance with a weighted sum of two or more factors;
the two or more factors include the second factor and a third factor; and
the third factor corresponds to a ratio of non-host write operations to host write operations in the non-volatile memory system.

21. The non-volatile memory system of claim 19, wherein:
responsive to the memory operation comprising a read operation, the response indicates that the read operation to non-volatile memory has been completed and that read data is ready to be sent to the host system; and
responsive to the memory operation comprising a write operation, the response indicates that write data has been stored in the write cache but not in non-volatile memory.

22. The non-volatile memory system of claim 21, wherein:
the read operation is completed before the time no earlier than the start time associated with the memory operation plus the determined throttle interval; and
the write operation is completed after the time no earlier than the start time associated with the memory operation plus the determined throttle interval.

* * * * *